(12) United States Patent  
Brotherton et al.

(10) Patent No.: US 7,044,273 B2  
(45) Date of Patent: May 16, 2006

(54) BRAKE DRUM STACKING METHOD AND BRAKE DRUM WITH DRUM STACKING STRUCTURE

(75) Inventors: Joseph A. Brotherton, Portland, OR (US); Timothy Todd Griffin, Athens, TN (US)

(73) Assignee: Consolidated Metco, Portland, OR (US)

( * ) Notice: Subject to any disclaimer, the term of this patent is extended or adjusted under 35 U.S.C. 154(b) by 0 days.

(21) Appl. No.: 10/414,415

(22) Filed: Apr. 14, 2003

(65) Prior Publication Data

US 2004/0251096 A1    Dec. 16, 2004

Related U.S. Application Data

(60) Provisional application No. 60/462,489, filed on Apr. 11, 2003.

(51) Int. Cl.
*F16D 65/00* (2006.01)
(52) U.S. Cl. .................................. 188/218 R
(58) Field of Classification Search ............ 188/218 R, 188/17, 18 R
See application file for complete search history.

(56) References Cited

U.S. PATENT DOCUMENTS

| | | | | |
|---|---|---|---|---|
| 2,041,776 A * | 5/1936 | Nelson | ................... | 188/218 R |
| 2,173,591 A * | 9/1939 | Miller et al. | ............ | 188/218 R |
| 2,978,073 A * | 4/1961 | Soddy | ................... | 188/218 R |
| 5,383,537 A * | 1/1995 | White | ................... | 188/218 R |
| 5,823,304 A * | 10/1998 | Wagg | ................... | 188/218 R |
| 6,530,458 B1 * | 3/2003 | Rau, III | ................. | 188/218 R |

OTHER PUBLICATIONS

GUNITE Service Bulletin, Gunite Corporation, published more than one year before the filing date of the present application and of the provisional application from which priority has been claimed.
Disclosure Letter with Figs. A and B.

* cited by examiner

*Primary Examiner*—Melanie Torres
(74) *Attorney, Agent, or Firm*—Edward J. Brosius

(57) ABSTRACT

Brake drums are described with a stacking structure which allows the brake drums to be stacked directly on top of one another. Desirably, some nesting of the brake drums occurs during this stacking. A method of stacking brake drums for storage and shipment is also described.

23 Claims, 5 Drawing Sheets

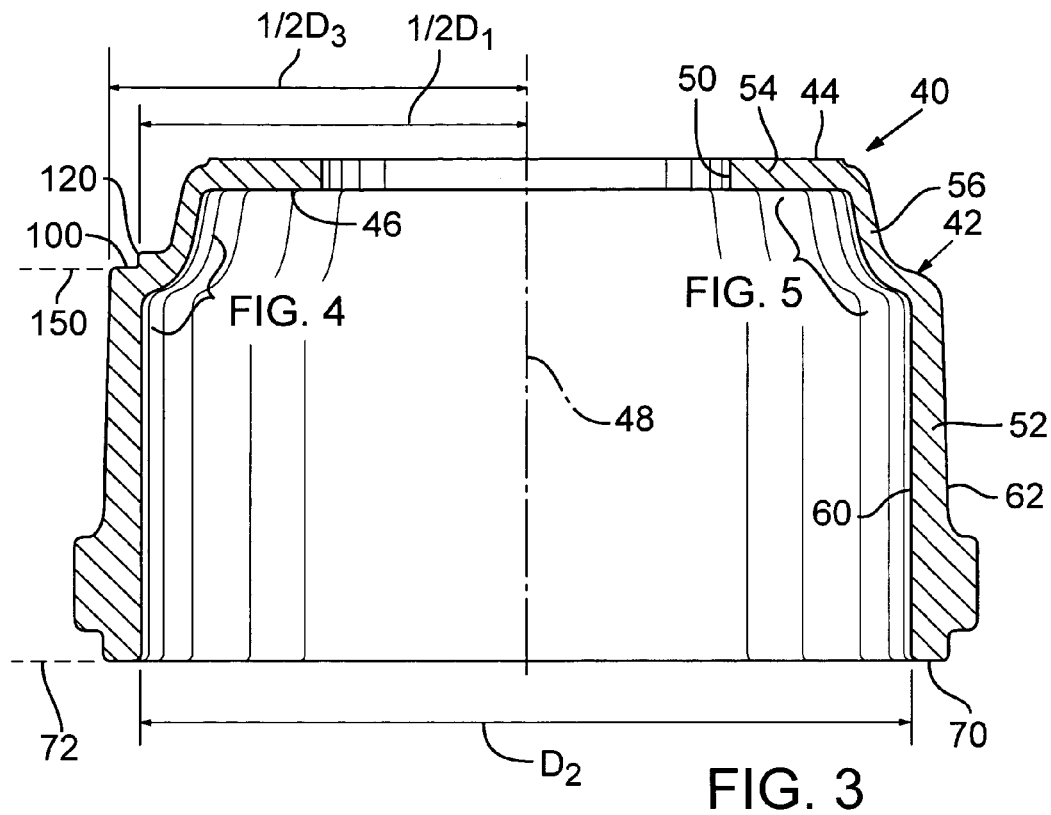
FIG. 3
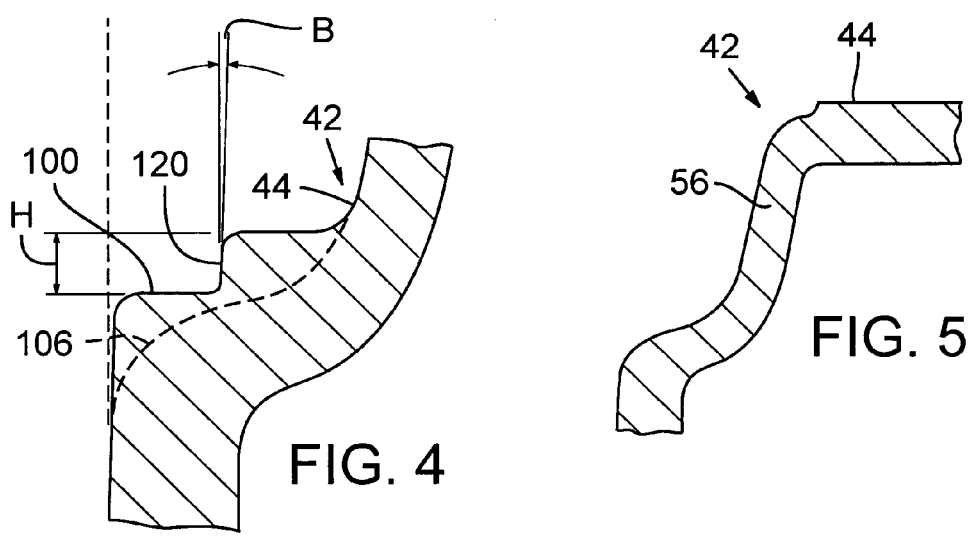
FIG. 4
FIG. 5

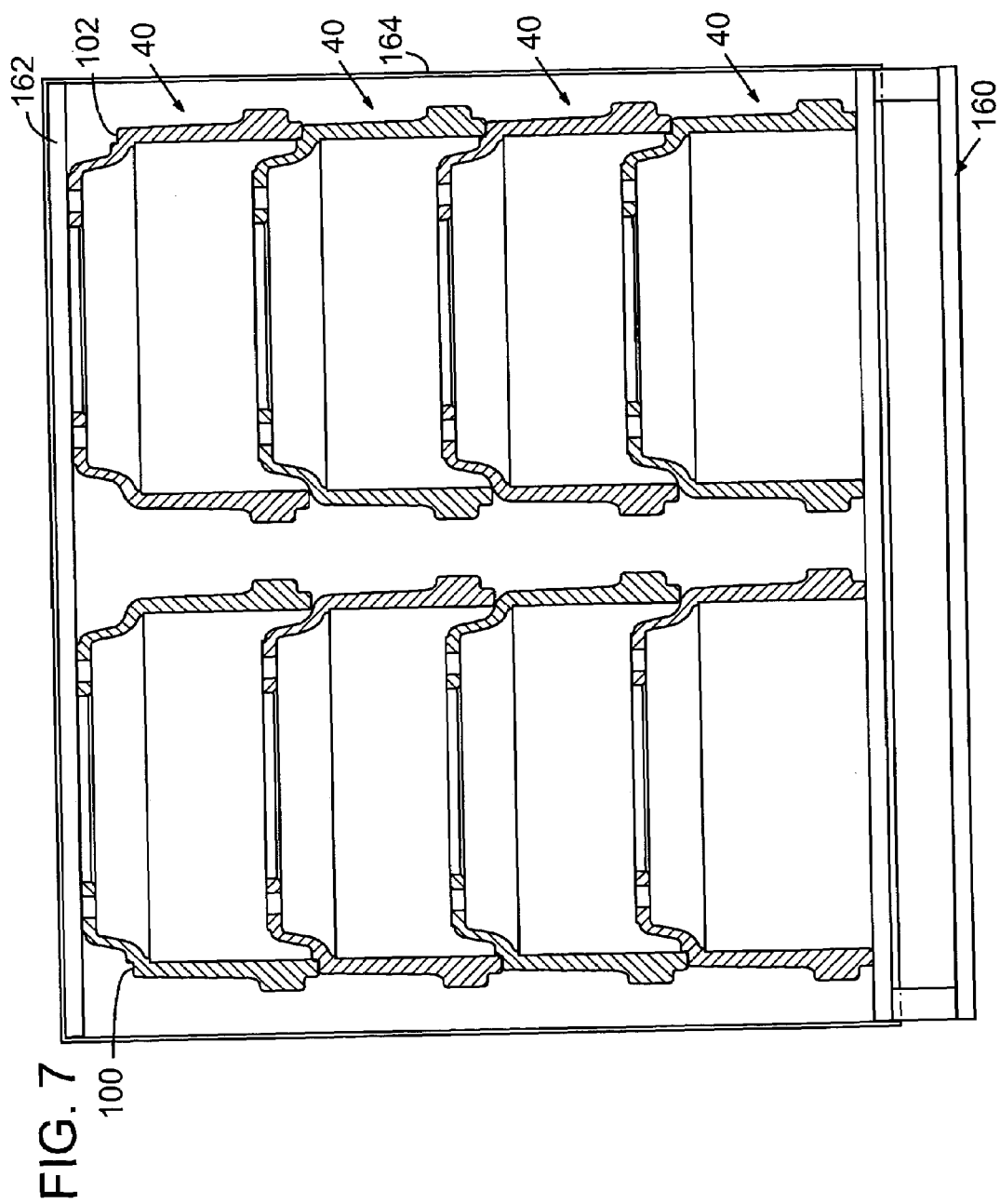

BRAKE DRUM STACKING METHOD AND BRAKE DRUM WITH DRUM STACKING STRUCTURE

RELATED APPLICATION DATA

This application claims the benefit of U.S. provisional patent application Ser. No. 60/462,489, filed Apr. 11, 2003, entitled, "Brake Drum Stacking Method And Brake Drum With Drum Stacking Structure", by Joe Brotherton and Todd Griffin, which is hereby incorporated by reference.

BACKGROUND

The present invention relates to a method of stacking brake drums for storage or shipment and to brake drums with a drum stacking structure.

With reference to FIG. 1, a plurality of brake drums, some of which have been numbered as 10, are shown strapped by metal straps, one strap being indicated at 12, to a pallet 14 for shipment. In FIG. 1, there are five layers of brake drums respectively indicated at 16, 18, 20, 22 and 24. Each layer or level of brake drums in FIG. 1 is comprised of five brake drums, one on each corner of the layer with one brake drum positioned in the center of the four corner drums. The bottom layer 16 of brake drums rest on an upper surface of pallet 14. The other layers 18, 20, 22 and 24 of brake drums each rest on a respective sheet of plywood (26, 28, 30 and 32) positioned between the respective brake drum layers. A top plywood sheet 34 rests on the upper surfaces of the brake drums of the upper layer 24. The straps 12 typically pass over the top of upper sheet 34. Given the dimensions of brake drums in certain applications, such as for heavy duty trucks, each of the plywood sheets 26, 28, 30, 32 and 34 typically is approximately one-half sheet of plywood. Although in theory the plywood could be returned to the brake drum shipper for reuse, this would involve shipping costs. In addition, oftentimes the plywood is simply not returned and new In another common approach, each layer has four drums with one drum being positioned at each corner of the layer.

Therefore, a need exists for improved brake drums with stacking features and for an improved method of stacking brake drums. The present invention is directed toward new and unobvious aspects of a brake drum with stacking features and brake drum stacking method acts, both alone and in various combinations and subcombinations with one another and as set forth in the claims below.

SUMMARY

One embodiment of a brake drum comprises: an annular body having a first longitudinal axis and comprising an exterior surface and an interior surface, the body having an annular wall portion with a right cylindrical interior brake engaging first wall surface, the first wall surface having a longitudinal axis which is coaxial with the first longitudinal axis, the first wall surface having a first diameter, the wall portion comprising an exterior second wall surface which is opposed to the interior first wall surface, the body also comprising an annular first rim portion extending between the first and second wall surfaces and in a plane which is perpendicular to the first longitudinal axis; a plurality of rim supporting lands at the exterior surface of the body, the lands defining segments of a rim-supporting shelf which is spaced from the first rim portion, a respective lateral motion limiting wall surface associated with each land and projecting in a direction away from the rim portion, the lateral motion limiting wall surface being positioned inwardly of the associated land, the maximum cross-sectional dimension between the lateral motion limiting wall surfaces in a lateral direction perpendicular to the first longitudinal axis being less than the first diameter, whereby the rim portion of a first brake drum may be positioned on the lands of a second like brake drum with the lateral motion limiting wall surfaces of the second brake drum being inserted into the interior space defined by the first wall surface of the first brake drum; and the lands extending radially outwardly from the first longitudinal axis such that lateral shifting of the first brake drum relative to the second drum in a lateral direction is limited by the lateral motion limiting wall surfaces of the second brake drum and prevents the rim portion of the first brake drum from shifting laterally off the lands of the second brake drum.

As another aspect of an embodiment, there may be three of said lands and the lands may be spaced 120 degrees apart about the first longitudinal axis.

The lateral motion limiting wall surfaces may each project upwardly from the associated land. In addition, at least a portion of each of the lateral motion limiting wall surfaces may angle inwardly moving in a direction away from the respective lands and away from the rim portion.

More specifically, each of the lateral motion limiting wall surfaces may each angle inwardly along its entire height.

The angle may be at least 3 degrees relative to a plane parallel to the first longitudinal axis and which intersects the location where the lateral motion limiting wall surface projects from the associated land. Desirably, the angle is from 3 degrees to 45 degrees. A particularly desirable range of angles is from 25 degrees to 35 degrees, with 30 degrees being a specific exemplary angle. The lateral motion limiting wall surfaces may each angle continuously in a radially inward direction from the associated land. The lateral motion limiting walls may also be arcuate.

In accordance with an embodiment, a first brake drum comprises: an annular body having a longitudinal axis and comprising an exterior surface and an interior surface, the body having a wall portion with a machined annular interior brake engaging first wall surface of a first radius about the longitudinal axis and being of a first diameter, the body comprising an exterior second wall surface which is opposed to the interior first wall surface, the body comprising an annular rim portion extending between the first and second wall surfaces; the body further comprising a rim supporting shelf at the exterior surface of the body which is spaced from the rim portion and which is positioned and dimensioned to receive and support a rim portion of a second brake drum which is like the first brake drum when the second brake drum is stacked onto the first brake drum; and the exterior surface comprising a stop which is operable to limit shifting of the stacked second brake drum in a direction perpendicular to the longitudinal axis so as to prevent the rim portion of the second brake drum from falling off the shelf of the first brake drum.

As another aspect, the shelf may comprise a plurality of spaced apart shelf segments. The shelf segments may be spaced apart an equal distance about the first longitudinal axis.

As a further aspect, the stop comprises a plurality of stop surfaces each associated with a shelf segment, the stop surfaces being located tangent to a circle having a second diameter which is less than the first diameter; and the shelf segments being located tangent to a circle having a third diameter which is greater than the first diameter.

The difference between the third and second diameter is desirably greater than the difference between the first and second diameter such that the brake drum rim portion remains on the shelf when shifted the maximum allowable extent in any lateral direction perpendicular to the first longitudinal axis.

A brake drum may comprise: an annular body; the body comprising a rim portion; brake drum rim portion supporting means for receiving and supporting the rim portion of another like brake drum when said brake drum and said another like brake drum are stacked; and said support means further comprising means for limiting the lateral shifting of the stacked brake drums to maintain the rim portion of the another brake drum on said support means of said brake drum.

In accordance with an embodiment, a pallet of brake drums comprises: a plurality of stacks of brake drums at least three brake drums high positioned one on top of another with no plywood sheets or other layering material between the adjacent layers of brake drums. The pallet may further comprise a top layer overlaying the top of the brake drums of the stacks and at least one coupler such as a strap tying the top layer to the pallet to retain the top layer in position.

A method of stacking brake drums for storage or shipment in one embodiment comprises: positioning a lower rim portion of a first brake drum onto an upwardly facing supporting shelf of a second brake drum with the first brake drum being stacked onto the second brake drum; and limiting lateral shifting of the first brake drum relative to the second brake drum to prevent the rim portion of the first brake drum from laterally shifting off of the supporting shelf of the second brake drum. The limiting act may further comprise the act of engaging the interior of the first brake drum upon lateral shifting of the first brake drum to limit the lateral shifting of the first brake drum.

The first and second brake drums are desirably nested together with the interior of the first brake drum receiving a portion of the exterior of the second brake drum when the rim portion of the first brake drum is supported on the shelf of the second brake drum.

At least three brake drums may be stacked in accordance with the method into a stack of brake drums.

As an aspect of a method, at least four stacks of at least three brake drums per stack may be on a pallet, a protective layer may be placed on top of the at least four stacks with the stacks sandwiched between the pallet and the protective layer, and the protective layer may be coupled, such as by strapping, to the pallet.

DETAILED DESCRIPTION OF THE DRAWINGS

FIG. 3 is a vertical sectional view of the brake drum of FIG. 2 taken along lines 3—3 of FIG. 2.

FIG. 4 is an enlarged view of a portion of the brake drum of FIG. 3, the portion having been labeled in FIG. 3 with the designation FIG. 4.

FIG. 5 is an enlarged mirror image view of a portion of the brake drum of FIG. 3, the portion having been labeled in FIG. 3 with the designation FIG. 5.

FIG. 7 illustrates a plurality of brake drums stacked for shipment in accordance with an embodiment of a method disclosed herein.

DETAILED DESCRIPTION

Figure 1:
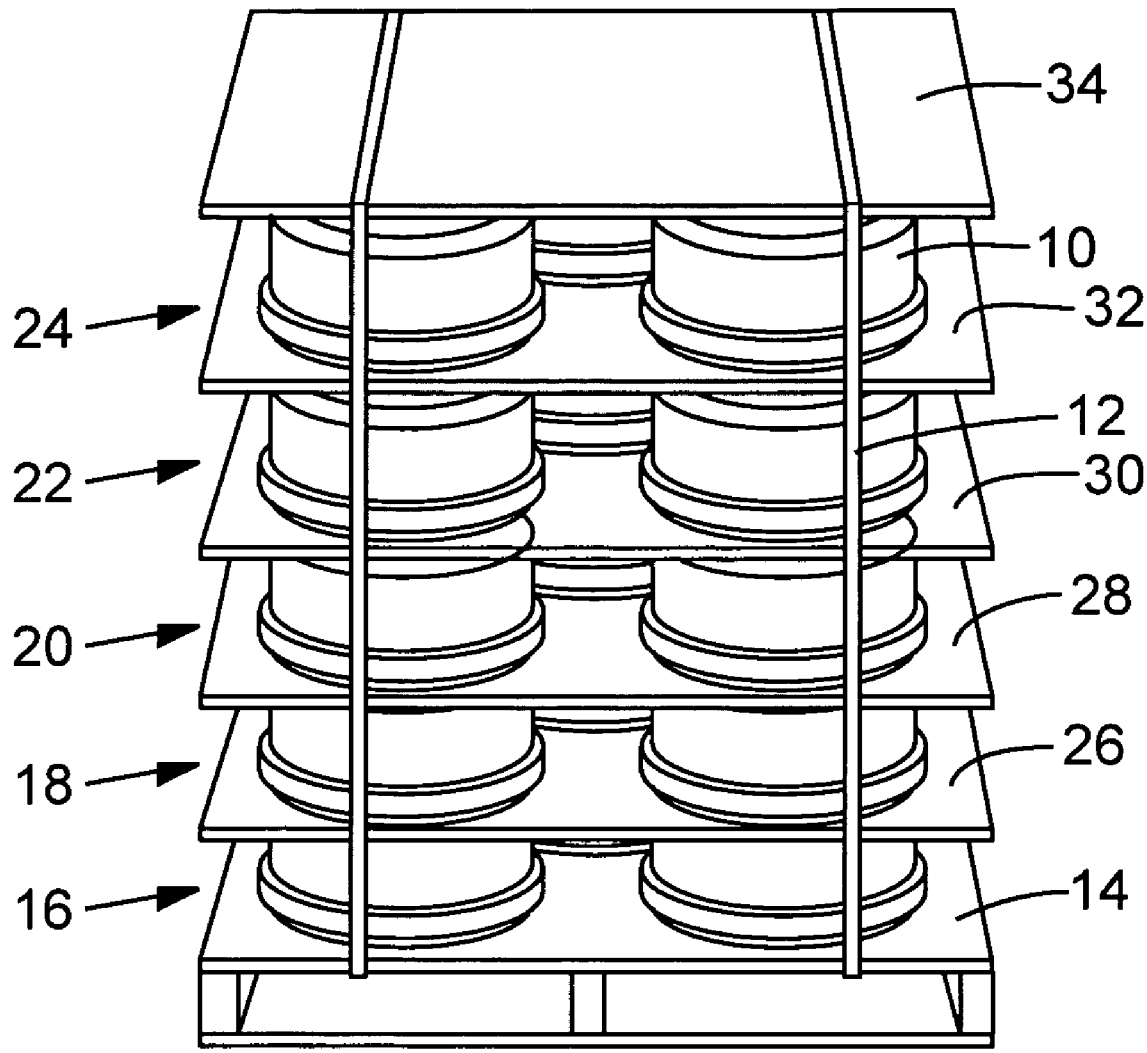
FIG. 1 is illustrates a plurality of brake drums stacked for shipment on a pallet with sheets of plywood used to separate layers of brake drums.

FIG. 1 illustrates an embodiment of a brake drum 40 provided with one form of stacking structure which allows a plurality of brake drums to be stacked one on top of another. The brake drum 40 is described by way of example only, as the invention is not limited to this particular embodiment of a brake drum or to the specific forms of stacking structures shown and described herein. Body 40 typically comprises a monolithic one-piece body formed, for example, by casting. Body 40 may be of any suitable material which is used for brake drums, such as materials used in brake drums currently available from Consolidated Metco, Inc., of Portland, Oreg., with cast iron being a specific example.

Brake drum 40 comprises an annular body 42 having an exterior surface 44 and an interior surface 46 (see FIG. 3). Body 42 has a longitudinal axis 48 and a central circular opening 50 centered on the longitudinal axis.

The body 42 further comprises a sidewall portion 52 and a top or end portion 54. A transition portion 56 extends between the end portion 54 and side wall portion 52.

The side wall portion 52, following machining of a casting to provide a brake drum engaging surface, comprises a right cylindrical interior first wall surface 60 having a longitudinal axis which is coaxial with axis 48. Wall portion 52 also comprises an exterior wall surface 62 which is opposed to the wall surface 60. In this case, opposed simply means that wall surface 62 is outside of the drum and is generally across the wall 52 from surface 60. The body 42 also comprises an annular rim portion 70 extending between wall surfaces 60 and 62 at a lower portion of the brake drum shown in FIG. 3. Rim portion 70 is desirably planar and, in FIG. 3, is shown located in a plane 72. Desirably, rim portion 70 is continuous about the entire periphery of the wall. Therefore, in this example, the brake drums do not have to be rotated to a particular relative orientation prior to stacking as explained below.

The diameter $D_2$ of annular surface 60 is variable and depends upon the specific configuration of the brake drum being manufactured. As one specific example, the interior diameter of the side wall of the casting, prior to final machining, may be 16.32 inches plus or minus 60 thousandths. Thus, the range of the interior diameter of the unfinished casting would be from 16.26 to 16.38 inches. Following machining to provide the brake engaging surface 60, an exemplary dimension of diameter $D_2$ for this example is 16.5 inches in diameter plus or minus 10 thousandths (from 16.49 to 16.51 inches). It should be noted that references to terms such as parallel and perpendicular in this description allows for some variation, such as permitted by tolerances associated with brake drum manufacture.

Figure 2:
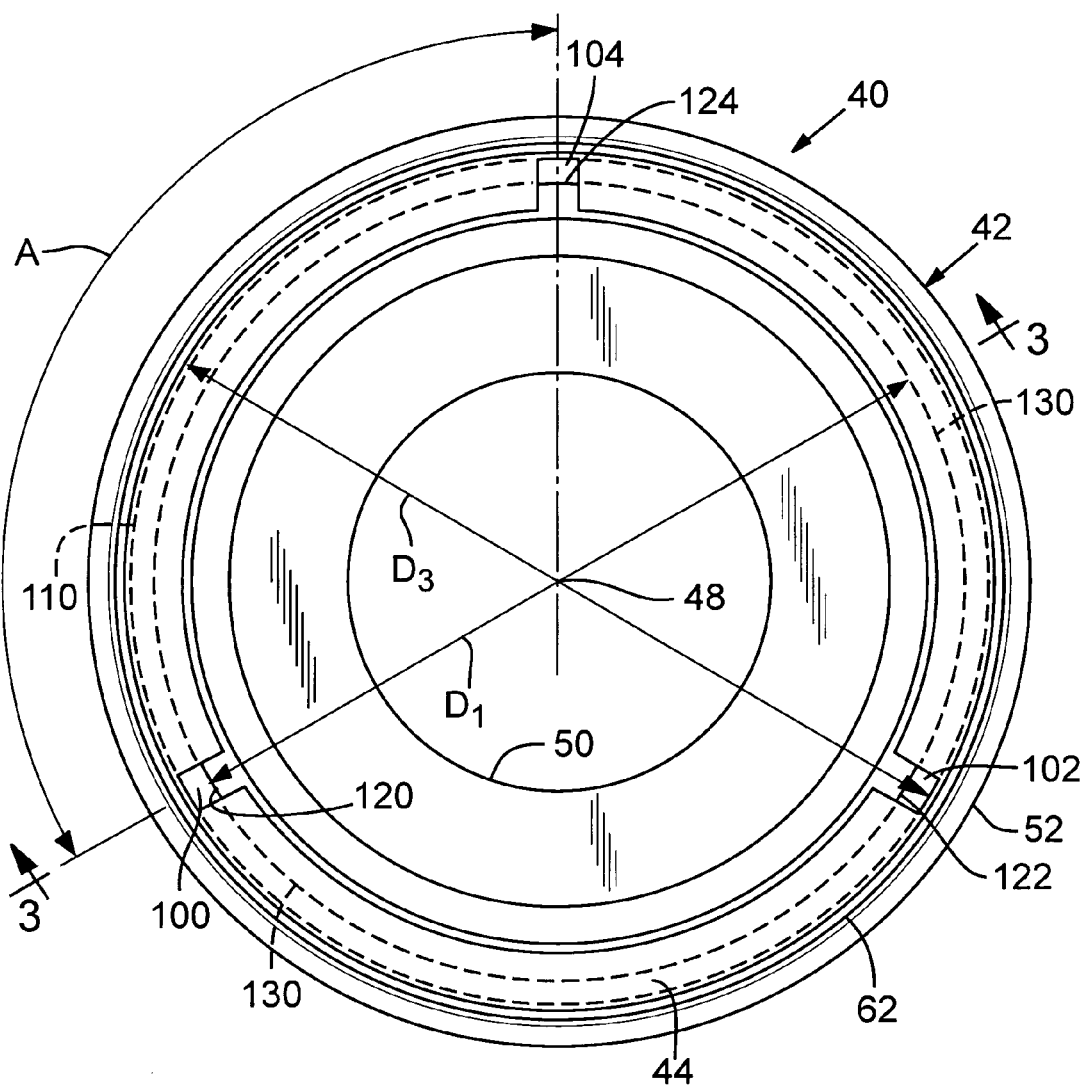
FIG. 2 is a top exterior view of one embodiment of a brake drum with drum stacking features.

With reference to FIG. 2, a brake drum stacking structure is provided in the exterior surface 44 of the brake drum and particularly in the end surface of the brake drum. This brake drum stacking structure desirably provides support for the rim portion 70 of one brake drum when stacked onto the stacking structure of a second similar brake drum.

In the illustrated embodiment, one such brake drum stacking structure comprises a plurality of spaced apart lands, such as three lands 100, 102 and 104, positioned adjacent to the perimeter of the brake drum 40. The illustrated lands 100, 102 and 104 project above the adjacent surface 44 of the brake drum. For example, the dashed line 106 in FIG. 4 illustrates the adjoining surface of the brake drum adjacent to land 100 and shows how land 100 projects above such adjacent surface of the brake drum. The lands 100, 102 and 104, because three such lands are provided, define a three point support for the rim portion 70 of a brake drum stacked onto the lands. Therefore, a stable support is provided inasmuch as three points define a plane. It is to be understood that the provision of a plurality of lands positioned to define segments of a rim supporting shelf is a particularly desirable embodiment. However, the lands 100, 102 and 104 may be replaced by other rim supporting structure, such as a continuous shelf which extends about the entire periphery of the brake drum, although this would be less desirable. In addition, the lands 100, 102 and 104 may be of extended length (e.g., encompass a greater arc about the axis 48). As a specific example, and although variable, the lands 100, 102 and 104 may be from ⅜ to 1 inch long.

As best seen in FIGS. 2 and 3, if one were to position the outer peripheral edge of each land inside a circle 110, (portion of circle 110 is shown in dashed lines in FIG. 2), which is tangent to such outer surface of the lands, the diameter of this circle may be expressed as $D_3$. In addition, a stop structure is provided radially inwardly of the lands 100, 102 and 104. In the embodiment of FIGS. 2 and 3, one form of stop structure comprises a respective wall or step riser surface 120 associated with land 100 and spaced radially inwardly from the land 100, a wall or step riser surface wall 122 associated with land 102 and spaced radially inwardly from land 102, and a wall or step riser surface 124 associated with land 104 and spaced radially inwardly from land 104. If one were to draw a circle, such as indicated in part by dashed lines 130 in FIG. 2, which is tangent to the location where the respective walls 120, 122 and 124 project upwardly from the associated lands 100, 102 and 104, the diameter of this circle may be expressed as $D_1$. The stop or motion limiting surfaces may take different configurations from those shown in FIG. 2. For example, they may extend about the entire periphery of the brake drum, although this is less desired. In addition, the step riser surfaces may be of the same length as the associated lands 100, 102 or 104, or they may be longer or shorter. In addition, the motion limiting structures may be placed intermediate the lands or at some other location as they need not be placed immediately adjacent to a land, although the positioning shown in FIG. 2 is a particularly desirable construction.

The height of the stops is desirably sufficient to resist lateral sliding motion of one drum relative to another drum when said one drum is stacked on the other drum. Lateral sliding motion refers to lateral motion in a direction in a plane perpendicular to the longitudinal axis 48. The height of the stops may be varied. Typically, the height is at least ⅛ inch and desirably from ¼ to ⅜ of an inch, although again it may be varied. This height is indicated by the letter H in FIG. 4.

The width of the supporting lands 100 is also variable. However, the lands extend radially (in width) a sufficient distance to continuously support the rim portion 70 of a stacked drum as one drum shifts the maximum extent in any lateral direction. Specifically, circle 130 is sized small enough for stacked drums to nest together with an interior volume defined by wall surface 60 of an upper drum receiving the respective walls 120,122 and 124 with wall surface 60 being adjacent to wall surfaces 120, 122 and 124. Thus, $D_1$ is less than $D_2$ to allow this nesting. In addition, the difference between diameters $D_1$ $D_2$ and $D_3$ are such that the maximum lateral shifting of a stacked drum as permitted by the respective walls or stops 120, 122 and 124 does not allow the rim portion 70 to slip off the supporting ledges 100,102 and 104.

In the example being discussed above, with a finished ID of wall 60 being 16.5 inches plus or minus 10 thousandths, an exemplary dimension for circle 130 is 16.36 inches plus or minus 60 thousandths (thus from 16.3 inches to 16.42 inches). In addition, an exemplary dimension of circle 110, the outer diameter of the shelf, is 17.52 inches minus 60 thousandths (thus 17.46 inches to 17.58 inches). In addition, although variable, the width of rim portion 70 may be about 0.75 inch.

In the illustrated embodiment, it is desirable that $D_3$ minus $D_1$ is greater than $D_1$ minus $D_2$. Again, the relative dimensions and configuration of the shelf and lateral motion limiting structure may be changed while still preventing the rim 70 from slipping off of the supporting shelf when a stacked drum laterally shifts.

With reference to FIG. 4, it is desirable that the lateral motion limiting wall surfaces, e.g., wall surfaces 120, 122 and 124, be sloped such as indicated by the angle B in FIG. 4. That is, desirably at least a portion and more desirably the entire surface of such walls are sloped or angled to shift radially inwardly moving in a direction away from the associated land. Desirably, angle B is at least 3 degrees and may range from 3 to 6 degrees to 45 degrees as a specific example, although this may be varied. A particularly desirable range would be from 25 degrees to 35 degrees with 30 degrees being a specifically desirable example. By sloping the walls 120, 122 and 124 in this manner, as the rim portion 70 of one brake drum is stacked onto another brake drum, the sloping walls tend to guide the rim portion onto the lands.

In FIG. 4, the land 100, as well as the lands 102 and 104, may be in a common plane, such as indicated by plane 150 in FIG. 3. Also, plane 150 may be parallel to plane 72. Alternatively, lands 100 may slope, for example slightly upwardly or downwardly in FIG. 4.

FIG. 5 illustrates a portion of the transition region 56 at a location where no land 102, 104 or 106 is positioned. This transition region may assume other configurations.

Figure 6:
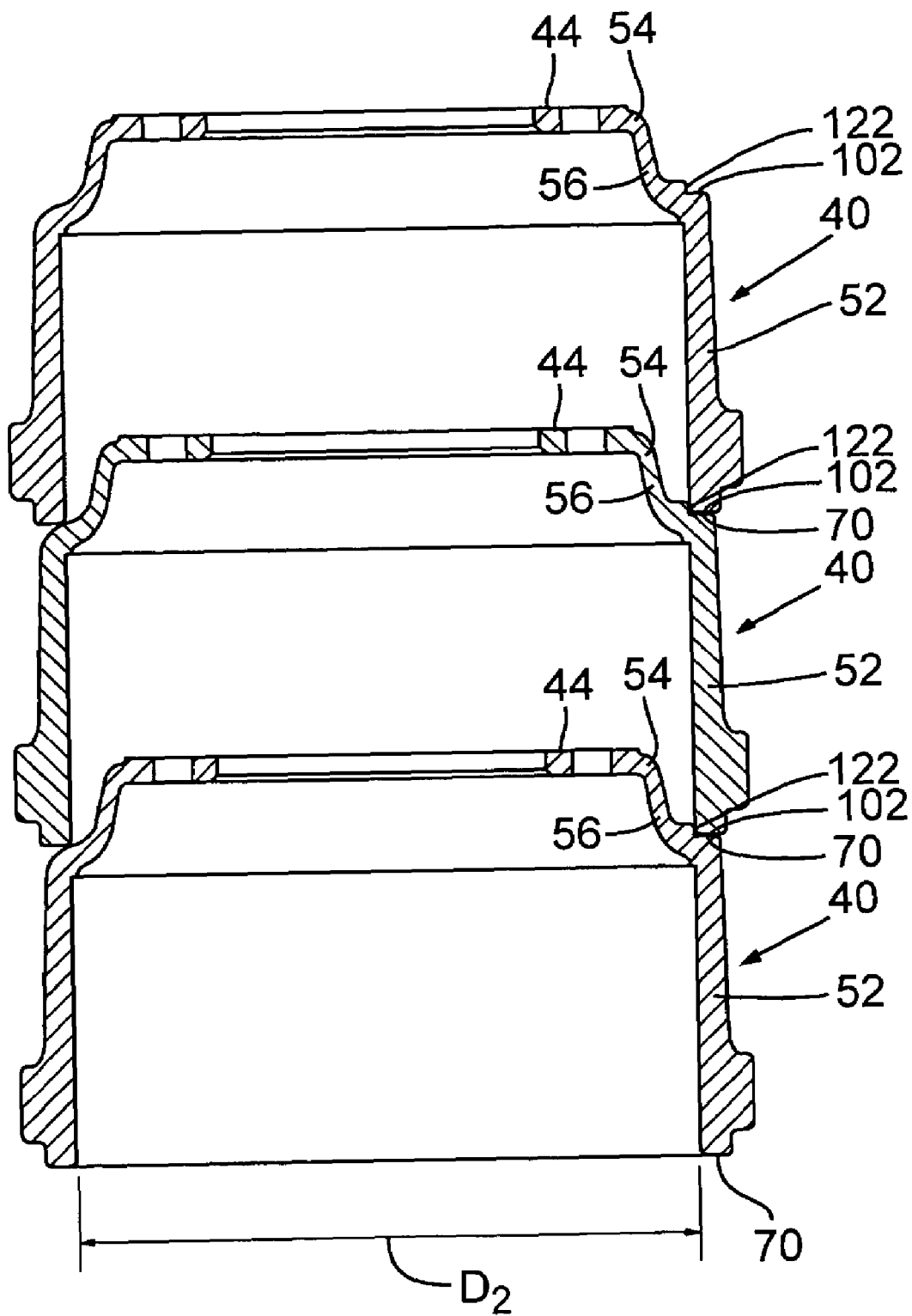
FIG. 6 illustrates an embodiment of a method of stacking of three brake drums.

FIG. 6 illustrates a stack of three drums 40 positioned one on top of the other with the rim portion of one drum supported by the supporting shelf portion of a lower drum. The illustration of FIG. 6 also shows a method of stacking at least three drums, for example for storage.

FIG. 7 illustrates a pallet 160 containing a plurality of stacks of brake drums. In the example of FIG. 7, two such stacks are shown with each stack containing four brake drums. The stacks may include, for example, three to five drums in each stack. The pallet 160 may be sized to contain, for example, one stack of brake drums at each corner of the pallet (for a total of four stacks of brake drums). In an alternative approach, five stacks of brake drums may be included on the pallet with one stack being in the center and the other four stacks arranged at the corners of the pallet and around the center stack of brake drums. As can be seen in FIG. 7, the stacked brake drums are placed one on top of another with the rim portion of the lowermost brake drum of each stack being placed on the pallet 160. Although not required, desirably in the embodiment of FIG. 7, a top protective layer 162, such as of plywood, overlies the top surfaces of the uppermost brake drums in the stacks. Thus, the stacks of brake drums are sandwiched between layer 162 and the pallet 160. The layer 162 may be coupled to the pallet 160 by any suitable coupling approach. In FIG. 7, a strap 164 (of exaggerated thickness) is shown threaded beneath the upper support portion of the pallet, extending upwardly along the two sides of the stacked brake drums, and across the top of the layer 162. Typically, a plurality of straps are used (e.g., two straps along each side of the stacked brake drums).

Having illustrated and described the principles of our invention with reference to several desirable embodiments, it should be apparent to those of ordinary skill in the art that these embodiments may be modified in arrangement and detail without departing from the inventive concepts disclosed herein. We claim all such embodiments which fall within the scope and spirit of the following claims.

We claim:

1. A brake drum comprising:

an annular body having a first longitudinal axis and comprising an exterior surface and an interior surface, the body having an annular wall portion with a right cylindrical interior brake engaging first wall surface, the first wall surface having a longitudinal axis which is coaxial with the first longitudinal axis, the first wall surface having a first diameter, the wall portion comprising an exterior second wall surface which is opposed to the interior first wall surface, the body also comprising an annular first rim portion extending between the first and second wall surfaces and in a plane which is perpendicular to the first longitudinal axis;

a plurality of rim supporting lands at the exterior surface of the body, the lands defining segments of a rim-supporting shelf which is spaced from the first rim portion, the rim supporting lands being at a common elevation when the first longitudinal axis is vertical, a respective lateral motion limiting wall surface associated with each land and projecting in a direction away from the rim portion, the lateral motion limiting wall surface being positioned inwardly of the associated land, the maximum cross-sectional dimension between the lateral motion limiting wall surfaces in a lateral direction perpendicular to the first longitudinal axis being less than the first diameter, whereby the rim portion of a first brake drum can be positioned on the lands of a second like brake drum with the lateral motion limiting wall surfaces of the second brake drum being inserted into the interior space defined by the first wall surface of the first brake drum; and the lands extending radially outwardly from the first longitudinal axis such that lateral shifting of the first brake drum relative to the second drum in a lateral direction is limited by the lateral motion limiting wall surfaces of the second brake drum and prevents the rim portion of the first brake drum from shifting laterally off the lands of the second brake drum.

2. A brake drum according to claim 1 wherein there are three of said lands.

3. A brake drum according to claim 1 wherein the body, the rim supporting lands and respective lateral motion limiting wall surfaces are a one-piece cast brake drum structure.

4. A brake drum comprising:

an annular body having a first longitudinal axis and comprising an exterior surface and an interior surface, the body having an annular wall portion with a right cylindrical interior brake engaging first wall surface, the first wall surface having a longitudinal axis which is coaxial with the first longitudinal axis, the first wall surface having a first diameter, the wall portion comprising an exterior second wall surface which is opposed to the interior first wall surface, the body also comprising an annular first rim portion extending between the first and second wall surfaces and in a plane which is perpendicular to the first longitudinal axis;

a plurality of rim supporting lands at the exterior surface of the body, the lands defining segments of a rim-supporting shelf which is spaced from the first rim portion, a respective lateral motion limiting wall surface associated with each land and projecting in a direction away from the rim portion, the lateral motion limiting wall surface being positioned inwardly of the associated land, the maximum cross-sectional dimension between the lateral motion limiting wall surfaces in a lateral direction perpendicular to the first longitudinal axis being less than the first diameter, whereby the rim portion of a first brake drum may be positioned on the lands of a second like brake drum with the lateral motion limiting wall surfaces of the second brake drum being inserted into the interior space defined by the first wall surface of the first brake drum; and the lands extending radially outwardly from the first longitudinal axis such that lateral shifting of the first brake drum relative to the second drum in a lateral direction is limited by the lateral motion limiting wall surfaces of the second brake drum and prevents the rim portion of the first brake drum from shifting laterally off the lands of the second brake drum; and wherein there are three of said lands and the three lands are spaced 120 degrees apart about the first longitudinal axis.

5. A brake drum comprising:

an annular body having a first longitudinal axis and comprising an exterior surface and an interior surface, the body having an annular wall portion with a right cylindrical interior brake engaging first wall surface, the first wall surface having a longitudinal axis which is coaxial with the first longitudinal axis, the first wall surface having a first diameter, the wall portion comprising an exterior second wall surface which is opposed to the interior first wall surface, the body also comprising an annular first rim portion extending between the first and second wall surfaces and in a plane which is perpendicular to the first longitudinal axis;

a plurality of rim supporting lands at the exterior surface of the body, the lands defining segments of a rim-supporting shelf which is spaced from the first rim portion, a respective lateral motion limiting wall surface associated with each land and projecting in a direction away from the rim portion, the lateral motion limiting wall surface being positioned inwardly of the associated land, the maximum cross-sectional dimension between the lateral motion limiting wall surfaces in a lateral direction perpendicular to the first longitudinal axis being less than the first diameter, whereby the rim portion of a first brake drum may be positioned on the lands of a second like brake drum with the lateral motion limiting wall surfaces of the second brake drum being inserted into the interior space defined by the first wall surface of the first brake drum; and the lands extending radially outwardly from the first longitudinal axis such that lateral shifting of the first brake drum relative to the second drum in a lateral direction is limited by the lateral motion limiting wall surfaces of the second brake drum and prevents the rim portion of the first brake drum from shifting laterally off the lands of the second brake drum; and wherein the lateral motion limiting wall surfaces each project upwardly from the associated land and wherein at least a portion of each of the lateral motion limiting wall surfaces angle inwardly moving in a direction away from the respective lands and away from the rim portion.

6. A brake drum according to claim 5 wherein each of the lateral motion limiting wall surfaces each angle inwardly along its entire height.

7. A brake drum according to claim 5 wherein the angle is at least 3 degrees relative to a plane parallel to the first longitudinal axis and which intersects the location where the lateral motion limiting wall surface projects from the associated land.

8. A brake drum according to claim 7 wherein the angle is from 3 degrees to 45 degrees.

9. A brake drum according to claim 7 wherein the angle is from 25 degrees to 35 degrees.

10. A brake drum according to claim 9 wherein the angle is 30 degrees.

11. A brake drum comprising:
an annular body having a first longitudinal axis and comprising an exterior surface and an interior surface, the body having an annular wall portion with a right cylindrical interior brake engaging first wall surface, the first wall surface having a longitudinal axis which is coaxial with the first longitudinal axis, the first wall surface having a first diameter, the wall portion comprising an exterior second wall surface which is opposed to the interior first wall surface, the body also comprising an annular first rim portion extending between the first and second wall surfaces and in a plane which is perpendicular to the first longitudinal axis;
a plurality of rim supporting lands at the exterior surface of the body, the lands defining segments of a rim-supporting shelf which is spaced from the first rim portion, a respective lateral motion limiting wall surface associated with each land and projecting in a direction away from the rim portion, the lateral motion limiting wall surface being positioned inwardly of the associated land, the maximum cross-sectional dimension between the lateral motion limiting wall surfaces in a lateral direction perpendicular to the first longitudinal axis being less than the first diameter, whereby the rim portion of a first brake drum may be positioned on the lands of a second like brake drum with the lateral motion limiting wall surfaces of the second brake drum being inserted into the interior space defined by the first wall surface of the first brake drum;
the lands extending radially outwardly from the first longitudinal axis such that lateral shifting of the first brake drum relative to the second drum in a lateral direction is limited by the lateral motion limiting wall surfaces of the second brake drum and prevents the rim portion of the first brake drum from shifting laterally off the lands of the second brake drum; and
wherein the lateral motion limiting wall surfaces each angle continuously in a radially inward direction from the associated land.

12. A brake drum according to claim 11 wherein the lateral motion limiting walls are arcuate.

13. A first brake drum comprising:
an annular body having a longitudinal axis and comprising an exterior surface and an interior surface, the body having a wall portion with a machined annular interior brake engaging first wall surface of a first radius about the longitudinal axis and being of a first diameter, the body comprising an exterior second wall surface which is opposed to the interior first wall surface, the body comprising an annular rim portion extending between the first and second wall surfaces;
the body further comprising a rim supporting shelf at the exterior surface of the body which is spaced from the rim portion and which is positioned and dimensioned to receive and support a rim portion of a second brake drum which is like the first brake drum when the second brake drum is stacked onto the first brake drum;
the exterior surface comprising a stop which is operable to limit shifting of the stacked second brake drum in a direction perpendicular to the longitudinal axis so as to prevent the rim portion of the second brake drum from falling off the shelf of the first brake drum; and
wherein the shelf is comprised of a plurality of spaced apart shelf segments, the shelf segments being at a common elevation when the longitudinal axis is vertical.

14. A brake drum according to claim 13 wherein the body, the shelf segments and stop are a one-piece cast brake drum structure.

15. A first brake drum comprising:
an annular body having a longitudinal axis and comprising an exterior surface and an interior surface, the body having a wall portion with a machined annular interior brake engaging first wall surface of a first radius about the longitudinal axis and being of a first diameter, the body comprising an exterior second wall surface which is opposed to the interior first wall surface, the body comprising an annular rim portion extending between the first and second wall surfaces;
the body further comprising a rim supporting shelf at the exterior surface of the body which is spaced from the rim portion and which is positioned and dimensioned to receive and support a rim portion of a second brake drum which is like the first brake drum when the second brake drum is stacked onto the first brake drum;
the exterior surface comprising a stop which is operable to limit shifting of the stacked second brake drum in a direction perpendicular to the longitudinal axis so as to prevent the rim portion of the second brake drum from falling off the shelf of the first brake drum;
wherein the shelf is comprised of a plurality of spaced apart shelf segments; and
wherein the shelf segments are spaced apart an equal distance about the first longitudinal axis.

16. A first brake drum comprising:
an annular body having a longitudinal axis and comprising an exterior surface and an interior surface, the body having a wall portion with a machined annular interior brake engaging first wall surface of a first radius about the longitudinal axis and being of a first diameter, the body comprising an exterior second wall surface which is opposed to the interior first wall surface, the body comprising an annular rim portion extending between the first and second wall surfaces;
the body further comprising a rim supporting shelf at the exterior surface of the body which is spaced from the rim portion and which is positioned and dimensioned to receive and support a rim portion of a second brake drum which is like the first brake drum when the second brake drum is stacked onto the first brake drum;

the exterior surface comprising a stop which is operable to limit shifting of the stacked second brake drum in a direction perpendicular to the longitudinal axis so as to prevent the rim portion of the second brake drum from falling off the shelf of the first brake drum;

wherein the shelf is comprised of a plurality of spaced apart shelf segments;

wherein the stop comprises a plurality of stop surfaces each associated with a shelf segment, the stop surfaces being located tangent to a circle having a second diameter which is less than the first diameter; and the shelf segments being located tangent to a circle having a third diameter which is greater than the first diameter.

17. A brake drum according to claim 16 wherein the difference between the third and second diameter is greater than the difference between the first and second diameter such that the brake drum rim portion remains on the shelf when shifted the maximum allowable extent in any lateral direction perpendicular to the first longitudinal axis.

18. A method of stacking brake drums for storage or shipment comprising:

positioning a lower rim portion of a first brake drum onto plural upwardly facing supporting shelves of a second brake drum with the first brake drum being stacked onto the second brake drum, the shelves being at a common elevation when the second brake drum is vertical; and limiting lateral shifting of the first brake drum relative to the second brake drum to prevent the rim portion of the first brake drum from laterally shifting off of the supporting shelves of the second brake drum.

19. A method according to claim 18 in which the limiting act comprises the act of engaging the interior of the first brake drum upon lateral shifting of the first brake drum to limit the lateral shifting of the first brake drum.

20. A method according to claim 19 comprising the act of nesting the first and second brake drums together with the interior of the first brake drum receiving a portion of the exterior of the second brake drum when the rim portion of the first brake drum is supported on the shelf of the second brake drum.

21. A method according to claim 20 comprising the act of stacking at least three brake drums in accordance with the method of claim 18 into a stack of brake drums.

22. A method according to claim 21 comprising the act of placing at least four stacks of at least three brake drums per stack on a pallet, placing a protective layer on the at least four stacks with the stacks sandwiched between the pallet and the protective layer, not positioning plywood between the stacks, and coupling the protective layer to the pallet.

23. A method according to claim 22 wherein the coupling act comprises the act of strapping the protective layer to the pallet.

* * * * *